(12) United States Patent
Kanai et al.

(10) Patent No.: US 6,226,123 B1
(45) Date of Patent: May 1, 2001

(54) OPTICAL SYSTEM FOR OBSERVING EQUIPMENT HAVING IMAGE-VIBRATION COMPENSATION SYSTEM

(75) Inventors: Moriyasu Kanai, Tokyo; Koichi Maruyama, Saitama-ken, both of (JP)

(73) Assignee: Asahi Kogyo Kabusiki Kaisha, Tokyo (JP)

( * ) Notice: Subject to any disclaimer, the term of this patent is extended or adjusted under 35 U.S.C. 154(b) by 0 days.

(21) Appl. No.: 09/222,885

(22) Filed: Dec. 30, 1998

(30) Foreign Application Priority Data

Jan. 6, 1998 (JP) ................................................ 10-001170

(51) Int. Cl.⁷ ............................ G02B 27/64; G02B 23/00
(52) U.S. Cl. .......................... 359/557; 359/554; 359/407
(58) Field of Search ...................................... 359/554–557, 359/407, 421–422, 432, 676–678, 683, 708, 689–690, 782–785; 396/52–55; 348/208

(56) References Cited

U.S. PATENT DOCUMENTS

| 4,974,950 | * | 12/1990 | Yamazaki et al. | 359/557 |
| 5,461,513 | | 10/1995 | Maruyama | 359/557 |
| 5,490,014 | * | 2/1996 | Suzuki | 359/557 |
| 5,530,594 | * | 6/1996 | Shibayama | 359/690 |
| 5,694,244 | * | 12/1997 | Abe et al. | 359/431 |
| 5,754,339 | | 5/1998 | Kanai et al. | 359/557 |
| 5,768,016 | * | 6/1998 | Kanbara | 359/554 |
| 5,842,054 | * | 11/1998 | Suzuki et al. | 396/55 |

FOREIGN PATENT DOCUMENTS

| 61-156019 | * | 7/1986 | (JP) | 359/431 |
| 4-318510 | * | 11/1992 | (JP) | 359/432 |
| 6-43365 | | 2/1994 | (JP) . | |
| 6308431 | | 11/1994 | (JP) . | |
| 10-20213 | | 1/1998 | (JP) . | |
| 10186228 | | 7/1998 | (JP) . | |

* cited by examiner

Primary Examiner—Thong Nguyen
(74) Attorney, Agent, or Firm—Greenblum & Bernstein, P.L.C.

(57) ABSTRACT

An optical system for a binocular is provided with an objective optical system, an erecting system and an eyepiece. The objective optical system includes a first lens group having positive refractive power, a second lens group having negative refractive power and a third lens group having positive refractive power. The second lens group and/or the third lens group is capable of moving in a direction perpendicular to an optical axis to stabilize an image. The objective optical system satisfies the following conditions:

(1) $0.1 < d_{12}/f_0$
(2) $0.7 < f_0/f_1 < 3.0$ where, $d_{12}$ is a distance between the first lens group and the second lens group, $f_0$ is the focal length of the objective optical system, and $f_1$ is the focal length of the first lens group.

13 Claims, 11 Drawing Sheets

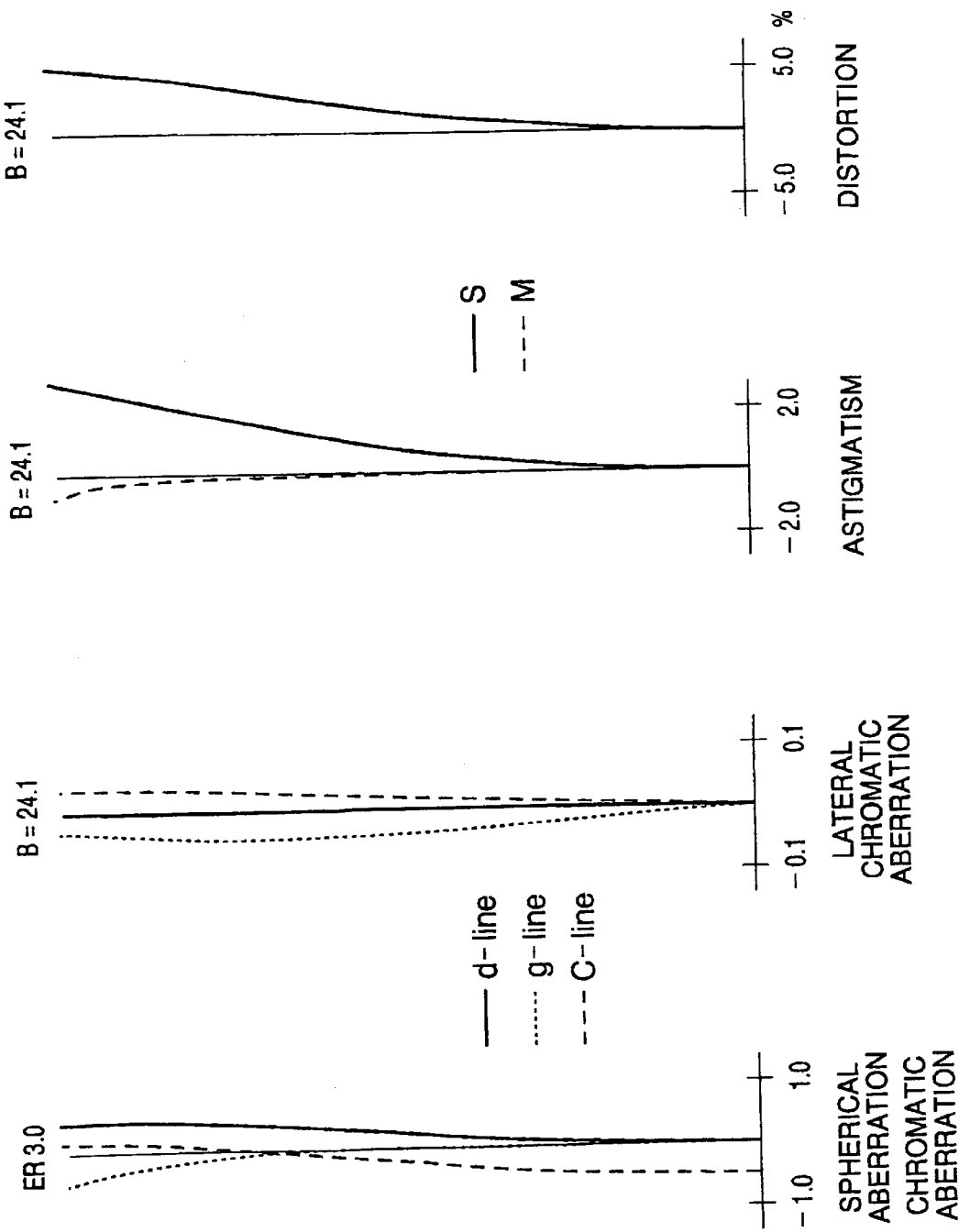

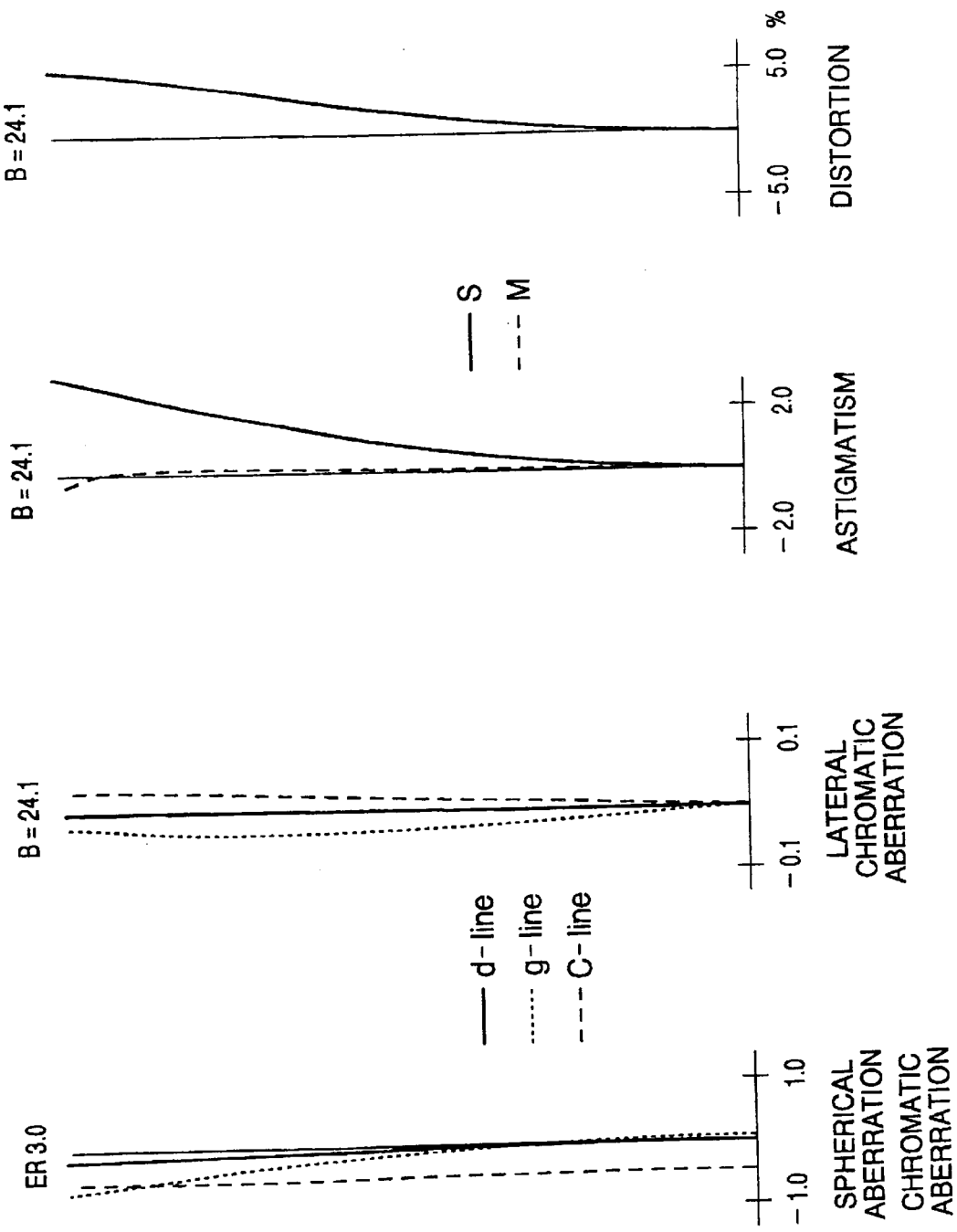

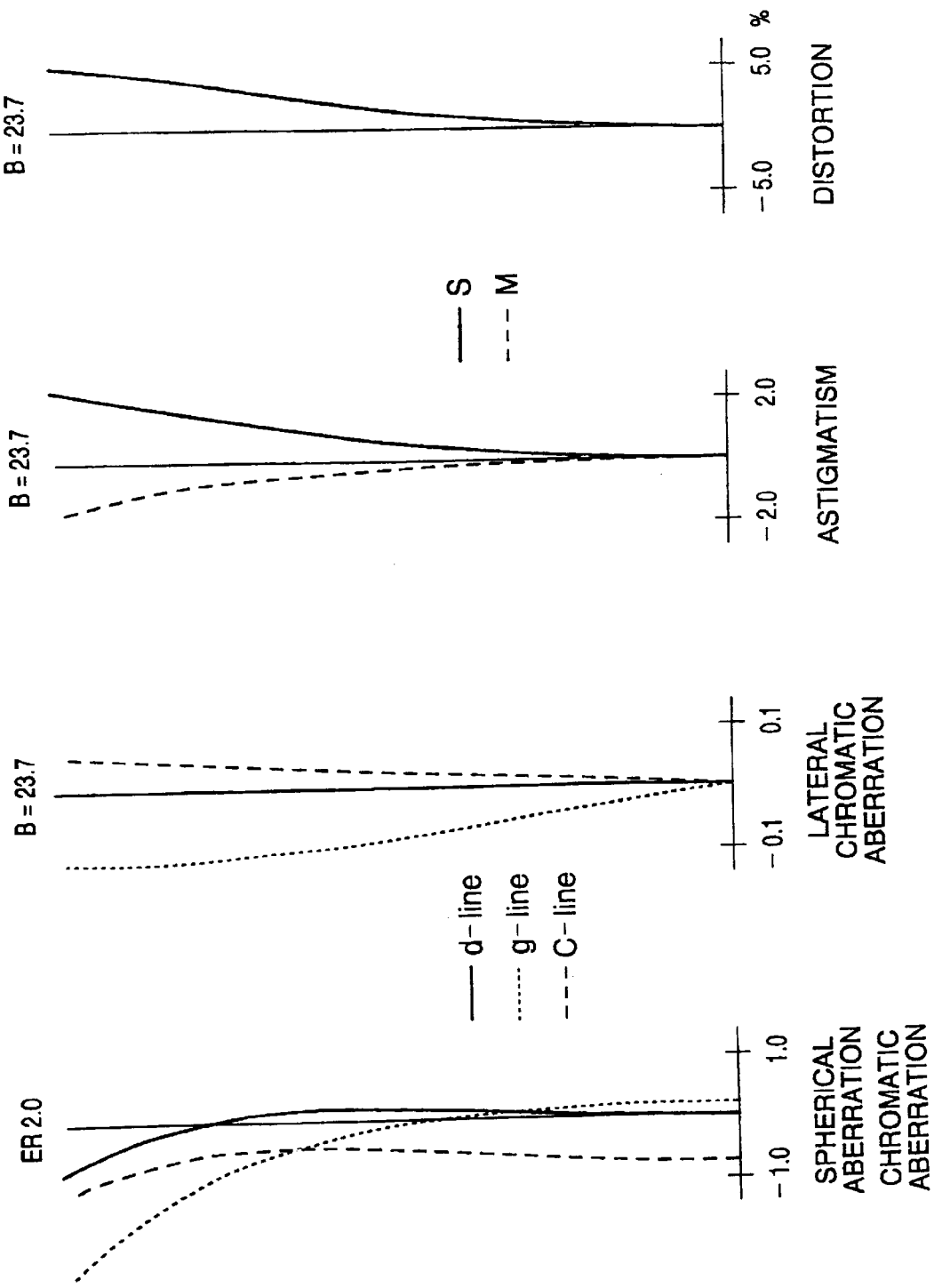

OPTICAL SYSTEM FOR OBSERVING EQUIPMENT HAVING IMAGE-VIBRATION COMPENSATION SYSTEM

BACKGROUND OF THE INVENTION

The present invention relates to an optical system for an observing equipment such as a binocular or a terrestrial telescope that has an image-vibration compensation system.

Recently, binoculars provided with image-vibration compensation systems for preventing vibration of observed image due to a hand-held shake of a user have been developed. Japanese Laid Open Publication No. HEI 6-43365 discloses an image-vibration compensation system of a binocular that employs a variable angle prism for each of telescopic optical systems of the binocular. A variable angle prism is located between an objective lens and an erecting system. When the optical system vibrates due to a hand-held shake of a user, the vertex angle of the variable angle prism is controlled to stabilize the image.

In such a construction, however, since the variable angle prism is located in the convergent light, if the vertex angle of the prism is changed, decentering coma occurs largely.

Another example of the image-vibration compensation system for binoculars is disclosed in Japanese Laid Open Publication No. HEI 6-308431. The binocular in the publication employs a compensation device that is attached in front of the objective optical systems of the binocular. Since the first lens of the objective optical system has the largest diameter in the telescopic optical system, in general, and the device is arranged in front of the first lenses, the device becomes large in size, which increases the size of the binocular.

SUMMARY OF THE INVENTION it is therefore an object of the present invention to provide an optical system of an observing equipment having image-vibration compensation system, which can reduce decentering coma during an image-vibration compensation, and is compact in size.

For the above object, according to the present invention, there is provided an optical system of an observing equipment having an image-vibration compensation system. The optical system includes an objective optical system that includes:

a first lens group having positive refractive power;

a second lens group having negative refractive power; and a third lens group having positive refractive power, the lens groups being arranged in that order from an object side, wherein at least one of the second and third lens groups is a compensation lens group that is movable in a direction perpendicular to an optical axis of the objective optical system to compensate a vibration of an image due to a hand-held shake, and wherein conditions (1) and (2) are satisfied:

(1) $0.1 < d_{12}/f_0$ (2) $0.7 < f_0/f_1 < 3.0$ where, $d_{12}$ is a distance between the first lens group and the second lens group, $f_0$ is the focal length of the objective optical system, that is, $f_0$ is the resultant focal length of the first, second and third lens groups, and $f_1$ is the focal length of the first lens group.

With this construction, since the compensation lens groups are parts of the objective optical system located at the image side in the objective optical system, the size of the compensation element becomes smaller than the conventional element which is located at the object side of the objective optical system.

In the specific embodiment where the second and third lens groups are the compensation lens groups, the following condition (3) is satisfied:

(3) $-0.95 < (\phi_2 - \phi_1)/(\phi_3 - \phi_2) < -1.05$ where, $\phi_1$ is a refractive power of the first lens group, $\phi_2$ is a resultant refractive power of the first lens group and the second lens group, and $\phi_3$ is a resultant refractive power of the first through third lens groups.

In the case where only the second lens group is movable in a direction perpendicular to the optical axis, it is desirable to satisfy condition (4). When only the third lens group is movable, it is desirable to satisfy condition (5). In the conditions, tan 1° equals to 0.0174551.

(4) $0.5 < |\tan 1°/(\phi_2 - \phi_1)| < 5.0$ (unit: mm)

(5) $0.5 < |\tan 1°/(\phi_3 - \phi_2)| < 5.0$ (unit: mm)

Further, if both the second and third lens groups are the compensation lens groups, it is desirable to satisfy the conditions (4) and (5). In such a case, the second lens group may be movable along a first direction in a plane perpendicular to the optical axis and the third lens group may be movable along a second direction that intersects the first direction at right angle in the plane.

In the preferred embodiments, the first lens group consists of a positive lens and a negative lens, the second lens group consists of only one negative lens or a combination of a negative lens and a positive lens, and the third lens group consists of a positive lens.

Optionally, the optical system may further include an eyepiece through which a user observes an image formed by the objective optical system. The optical system may still further include erecting system that is located between the objective optical system and the eyepiece.

DESCRIPTION OF THE ACCOMPANYING DRAWINGS

Figure 1:
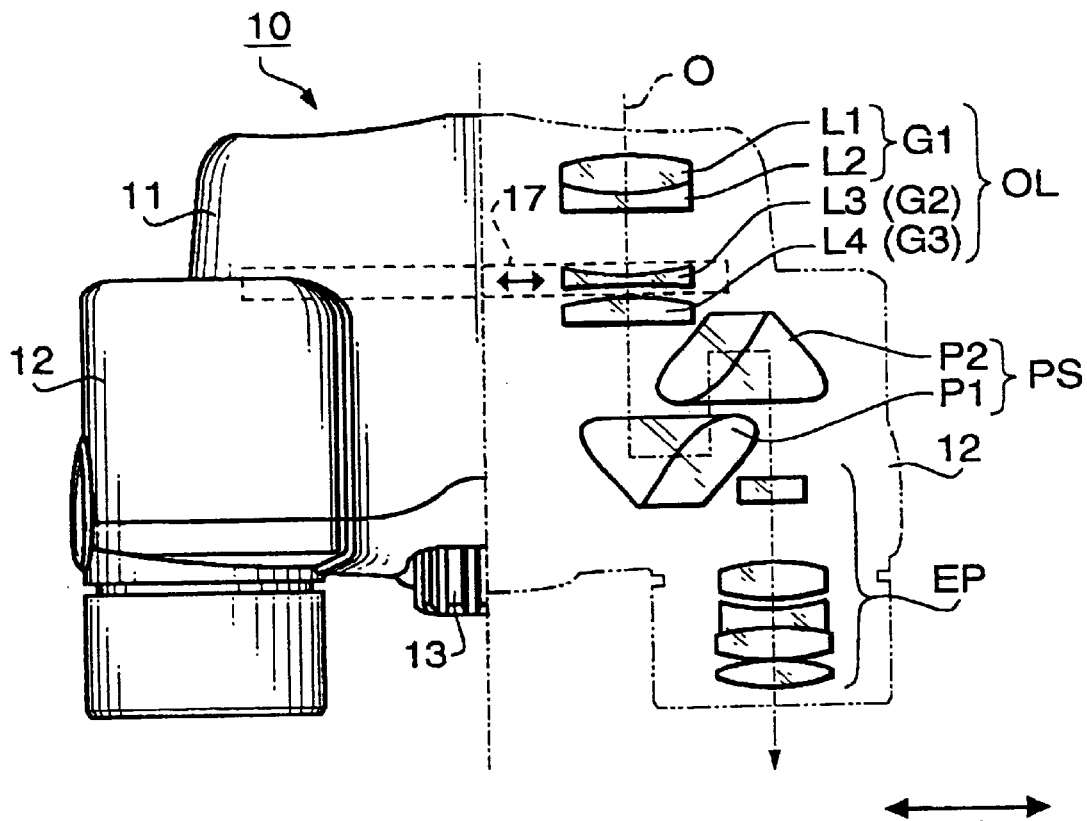
FIG. 1 is a plane view of a binocular that employs an optical system of the present invention with showing one of two telescopic optical systems.
Figure 3:
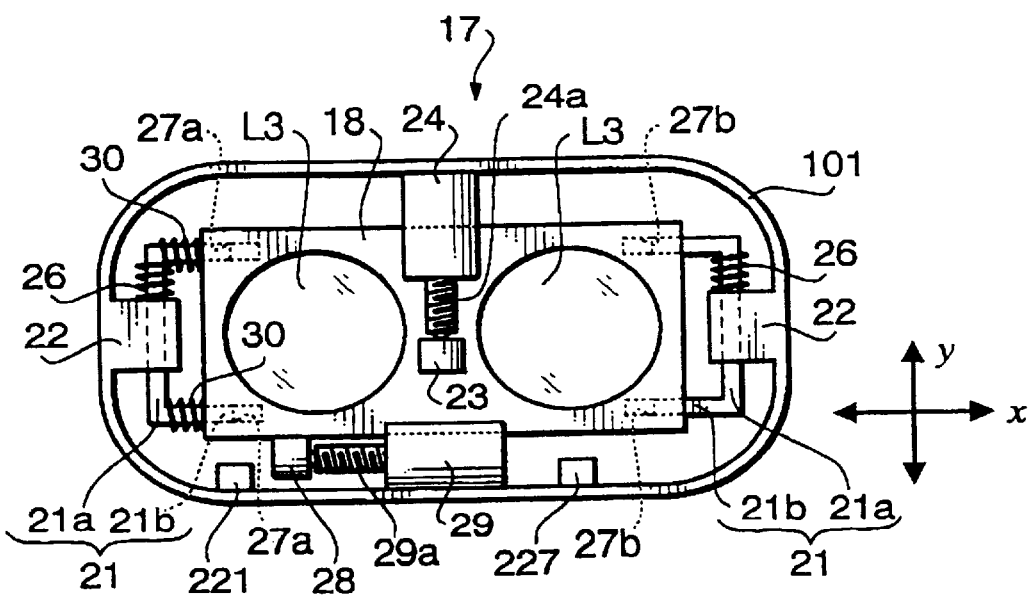
Figure 4:
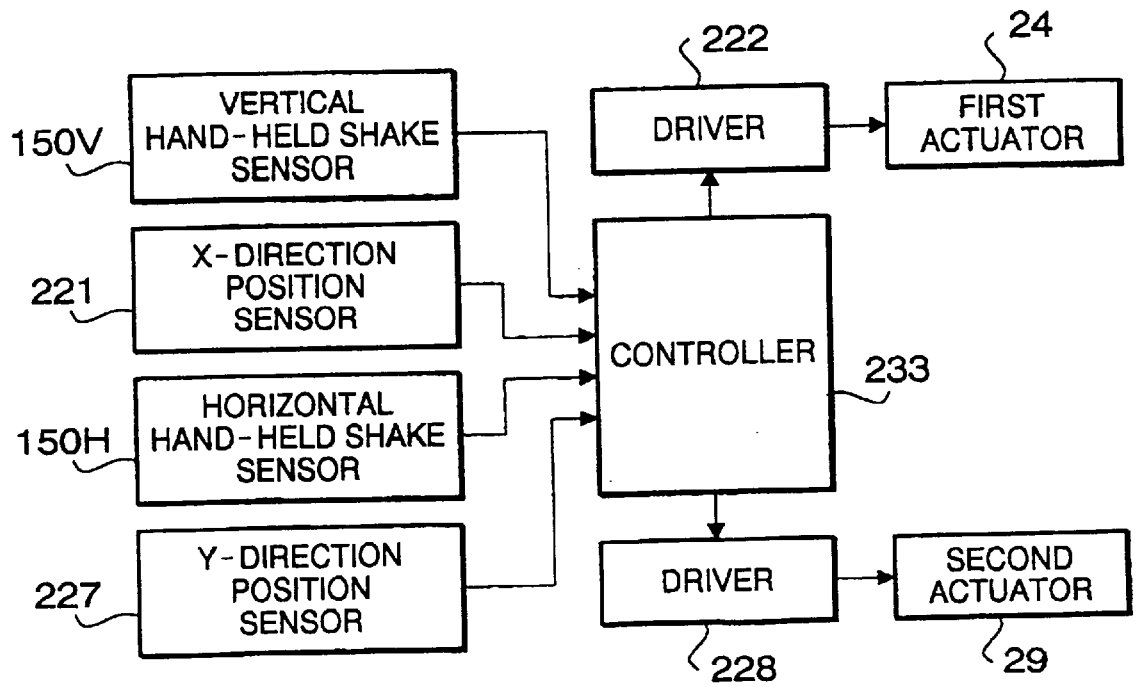
Figure 5:
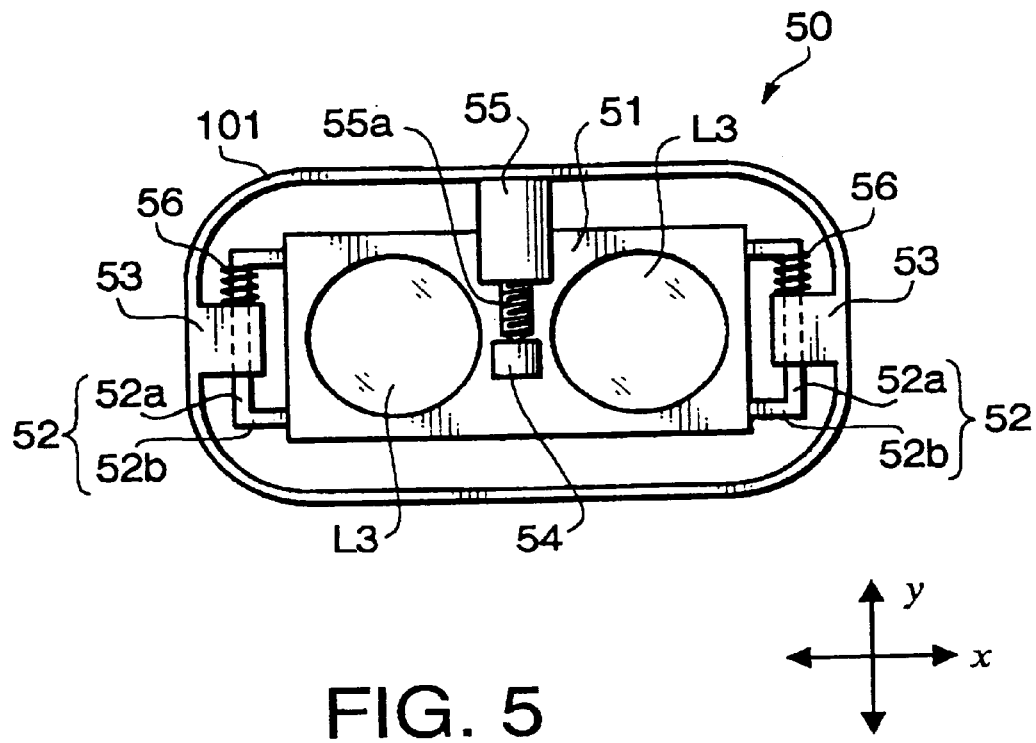
Figure 6:
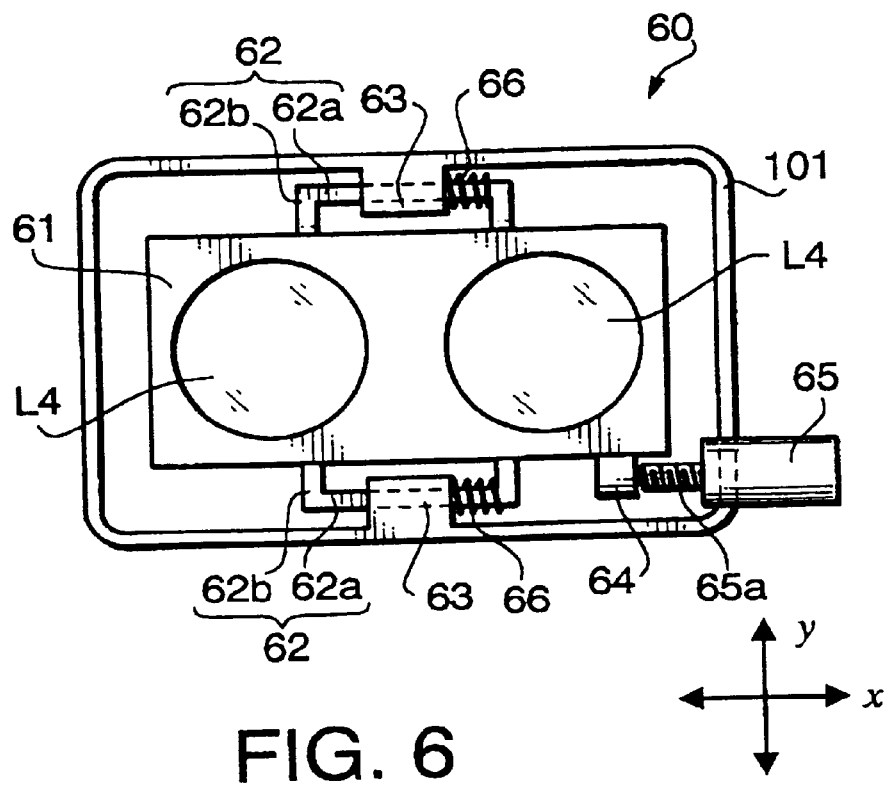
Figure 7:
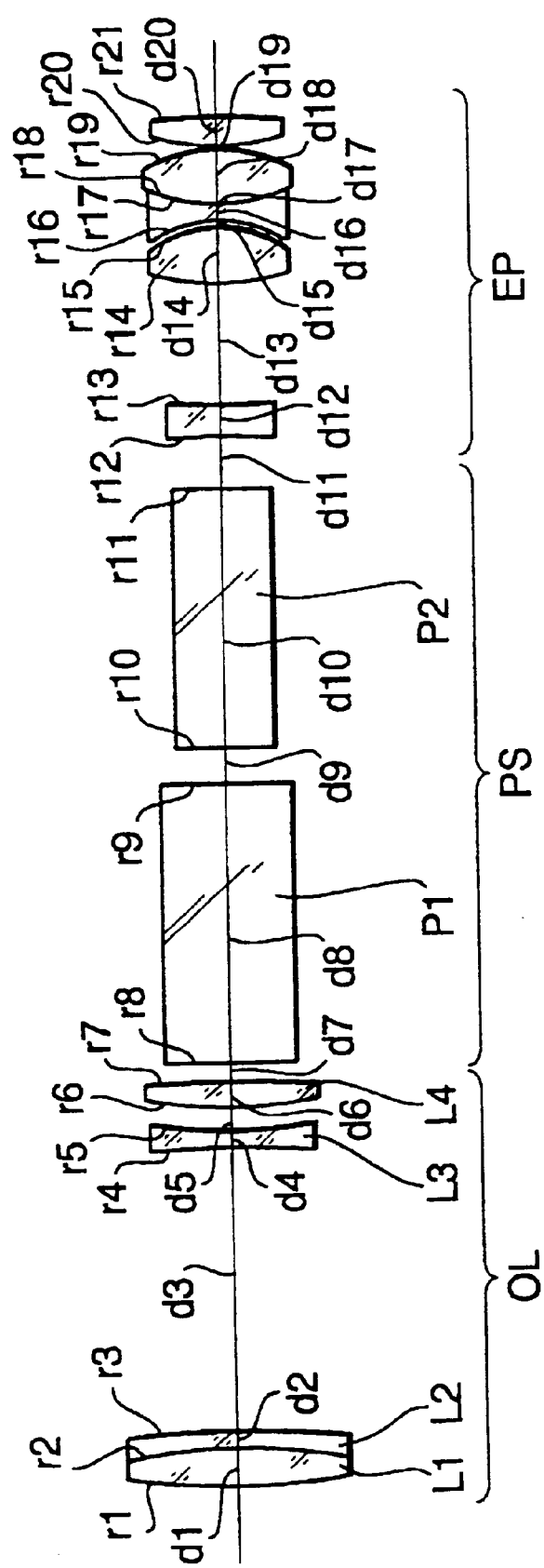
Figure 9A:
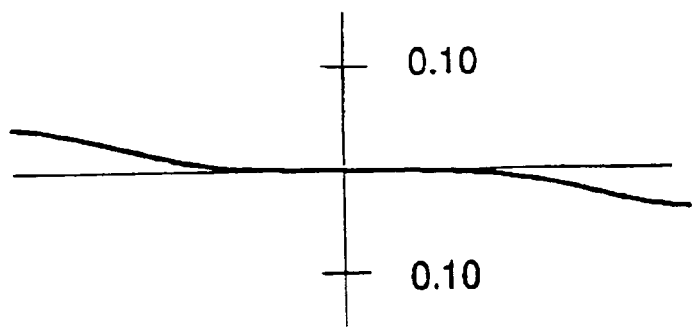
Figure 9B:
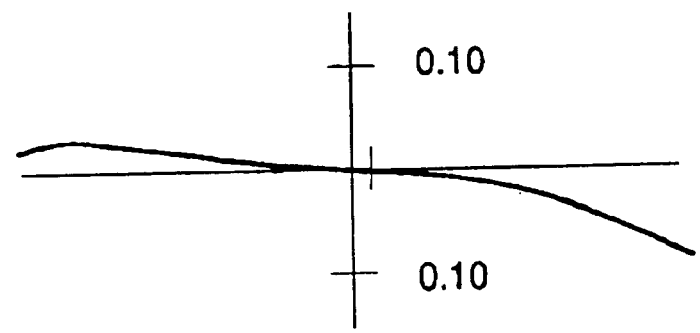
Figure 9C:
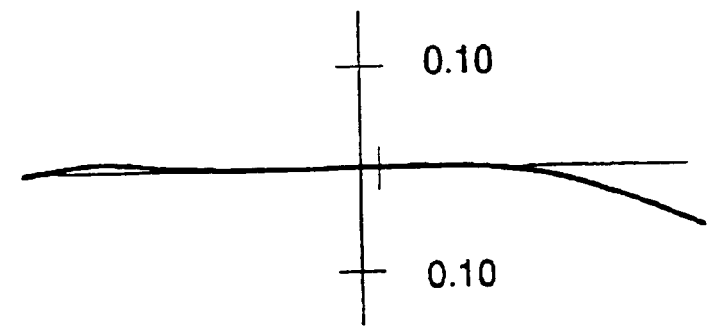
Figure 10:
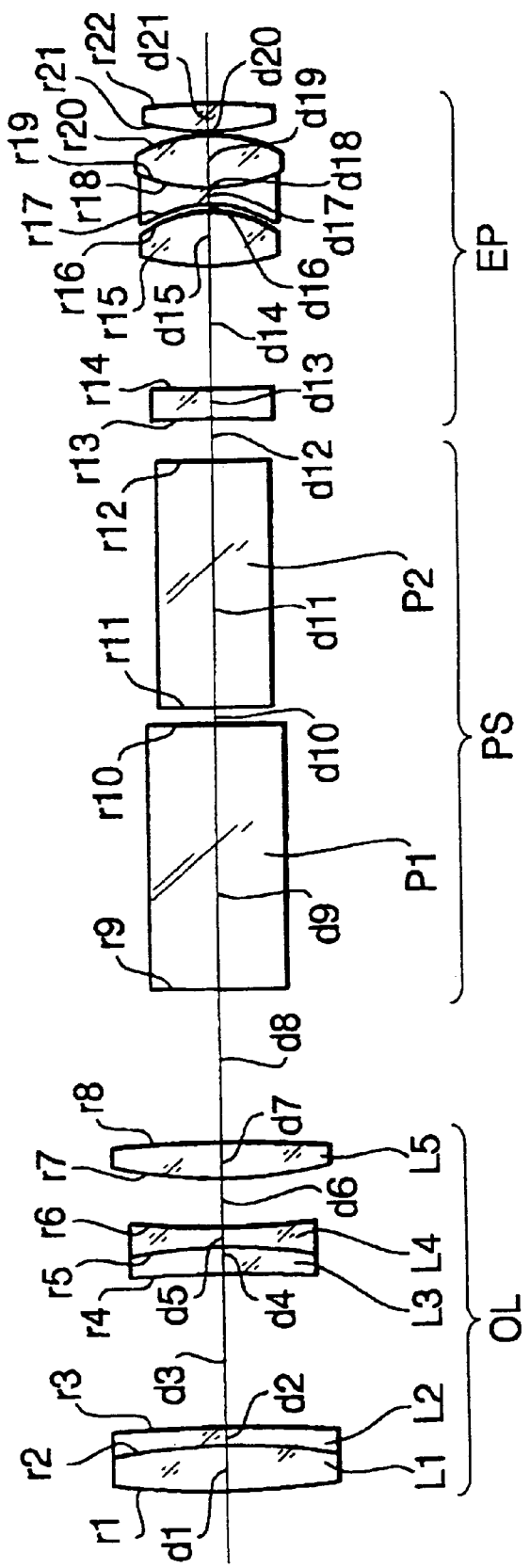
Figure 12A:
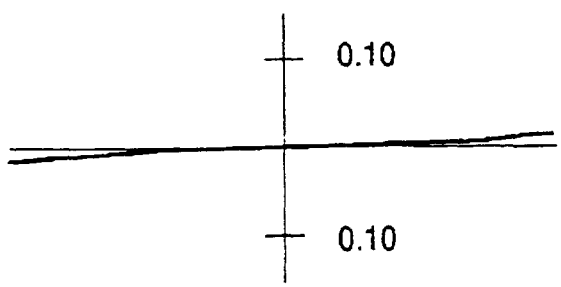
Figure 12B:
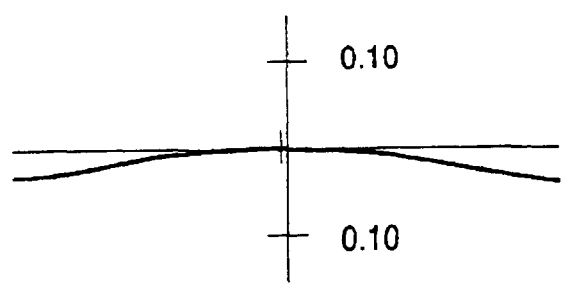
Figure 15A:
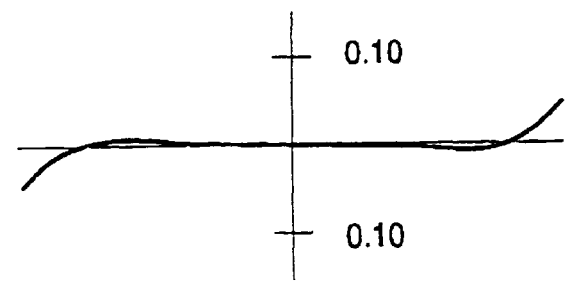
Figure 15B:
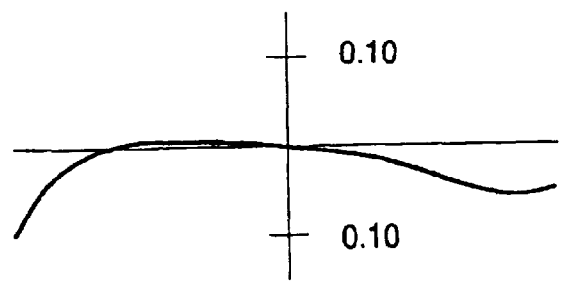
Figure 13:
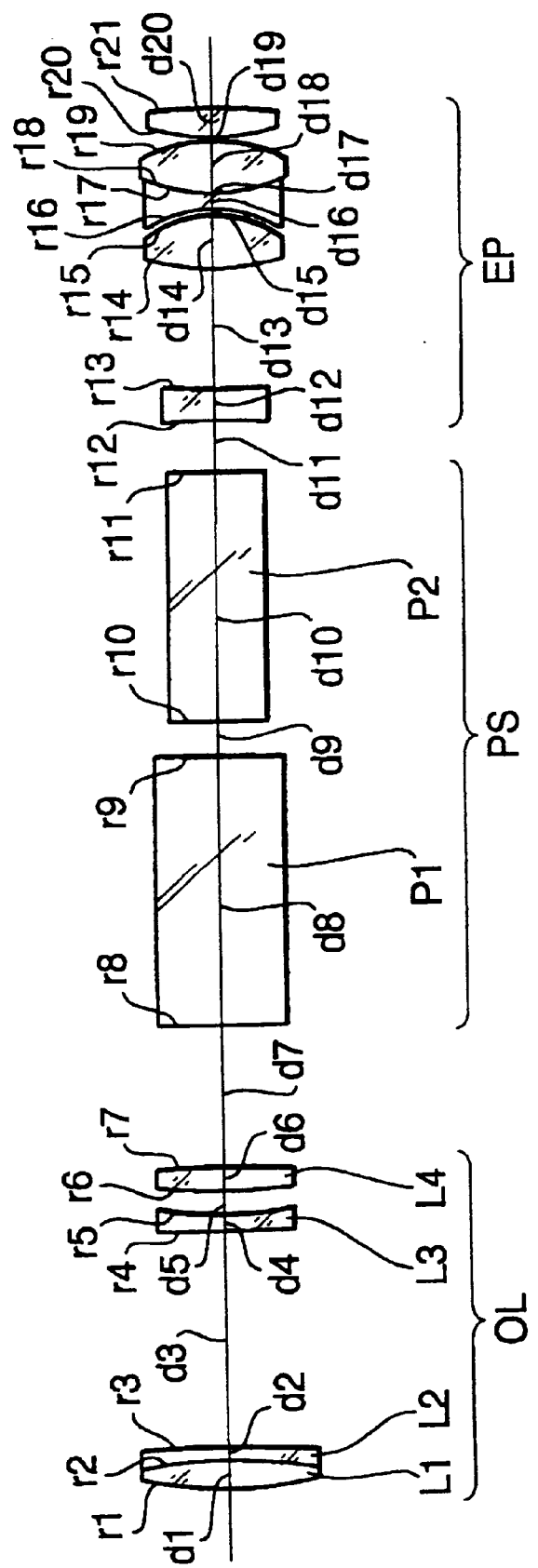

FIG. 3 schematically shows a structure of the driving mechanism shown in FIG. 1;

FIG. 4 is a block diagram illustrating a control system for controlling the driving mechanism;

FIG. 5 schematically shows a modified structure of the driving mechanism for a second lens group;

FIG. 6 schematically shows a modified structure of the driving mechanism for a third lens group;

FIG. 7 is a lens diagram showing a telescopic optical system according to a first embodiment;

FIGS. 8A through 8D show various aberrations of the telescopic optical system shown in FIG. 7;

FIG. 9A shows axial coma of the telescopic optical system shown in FIG. 7 when any lens groups are not decentered;

FIG. 9B shows axial coma of the telescopic optical system shown in FIG. 7 when the second lens group is decentered to stabilize an image when a tilt angle is 1 degree;

FIG. 9C shows axial coma of the telescopic optical system shown in FIG. 7 when the third lens group is decentered to stabilize an image when a tilt angle is 1 degree;

FIG. 10 is a lens diagram showing a telescopic optical system according to a second embodiment;

FIGS. 11A through 11D show various aberrations of the telescopic optical system shown in FIG. 10;

FIG. 12A shows axial coma of the telescopic optical system shown in FIG. 10 when any lens groups are not decentered;

FIG. 12B shows axial coma of the optical system shown in FIG. 10 when the third lens group is decentered to stabilize an image when the tilt angle is 1 degree;

FIG. 13 is a lens diagram showing a telescopic optical system according to a third embodiment;

FIGS. 14A through 14D show various aberrations of the telescopic optical system shown in FIG. 13;

FIG. 15A shows axial coma of the telescopic optical system shown in FIG. 13 when any lens groups are not decentered; and FIG. 15B shows axial coma of the optical system shown in FIG. 13 when the second lens group is decentered to stabilize an image when the tilt angle is 1 degree.

DESCRIPTION OF THE EMBODIMENTS

Figure 2:
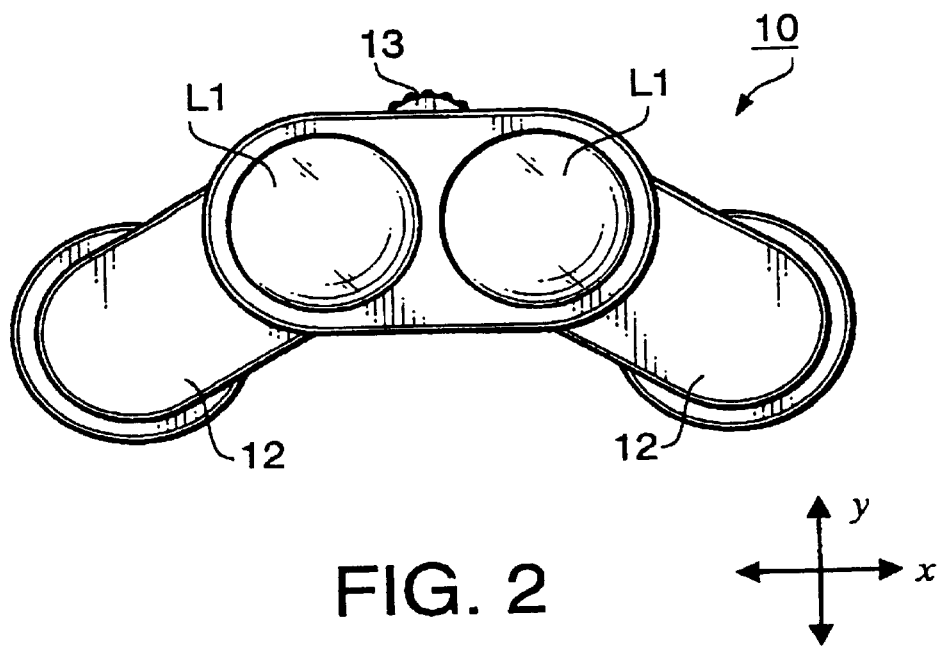
FIG. 2 is a front view of the binocular shown in FIG. 1.

FIG. 1 shows a binocular 10 that employs a pair of telescopic optical systems according to the invention. The binocular 10 also employs an image-vibration compensation system. FIG. 2 shows a front view of the binocular 10. The binocular 10 includes a center body 11 and a pair of grip portions 12 that are connected to the center body 11 at right and left side thereof, respectively. The grip portions 12 are rotatable with respect to the center body 11 in order to adjust a distance therebetween to fit a pupil distance of a user. A diopter adjusting dial 13 is attached to a rear portion of the center body 11.

The binocular 10 is provided with right and left telescopic optical systems arranged side by side for right and left eyes of the user. Since the left telescopic optical system is symmetric to the right telescopic optical system, FIG. 1 shows elements included in the right telescopic optical system, and description is directed thereto.

The telescopic optical system consists of an objective optical system OL for forming an image of an object, an erecting system PS for erecting the image, and an eyepiece EP.

The objective optical system OL, which is provided in the center body 11, includes: a first lens group G1 having positive refractive power; a second lens group G2 having negative refractive power; and a third lens group G3 having positive refractive power. The first to third lens groups G1, G2 and G3 are arranged in this order from an object side. The first lens group G1 consists a positive first lens L1 and a negative second lens L2 that are cemented to each other. The second lens group G2 consists of an aspherical third lens L3 and the third lens group G3 consists of an aspherical fourth lens L4. The image side surface of the third lens L3 and the object side surface of the fourth lens L4 are formed to be aspherical surfaces in order to correct spherical aberration thereof. It should be noted that the second lens group G2 may consist of a positive lens and a negative lens that are spherical lenses in place of the aspherical third lens L3.

The third lens L3 (i.e., the second lens group G2) is mounted on a driving mechanism 17 that moves the third lens L3 in first and second directions perpendicular to an optical axis 0 of the objective optical system OL.

The objective optical system OL forms an inverted image, and the inverted image is erected into proper orientation through the erecting system PS. The erecting system PS is provided with a first prism P1 and a second prism P2, which constitute type II Porro prism system. The first prism P1 has two reflection surfaces for rotating the image by 90 degrees, and the second prism PS2 also has two reflection surfaces for further rotating the image by 90 degrees.

The eyepiece EP has five lenses though which a user observes the image erected by the erecting system PS. The objective optical system OL and the first prism P1 is arranged in the center body 11, and the second prism P2 and the eyepiece EP are arranged in the grip portion 12.

The grip portion 12 is rotatable, with respect to the center body 11, about the optical axis O of the objective optical system OL. The erecting system PS and the eyepiece EP are rotated together with the grip portion 12. The left and right grip portions rotate in the opposite directions, and the user can adjust the distance between the left and right eyepieces to correspond to the pupil distance of the user.

In this specification, an x-axis direction that is the first direction and a y-axis direction that is the second direction are defined with respect to the binocular 10. The y-axis direction is defined as a direction which is perpendicular to a plane including the optical axes O of both the right and left telescopic optical systems. The x-axis direction is defined as a direction, which is parallel to a plane perpendicular to the optical axis O, and is perpendicular to the y-axis direction. Thus, the x-axis and y-axis are perpendicular to each other, and both are perpendicular to the optical axis O.

The driving mechanism 17 drives the third lens L3 in the x-axis and y-axis directions such that the image viewed by a user is stabilized even when a hand-held shake is applied to the binocular 10.

At the initial or neutral position of the third lens L3, the optical axis of the third lens L3 is coincident with the optical axis O of the first and second lenses L1 and L2.

When the object side of the binocular 10 moves, relatively to the eyepiece side, in the y-axis direction due to a hand-held shake, the driving mechanism 17 moves the third lens L3 in the y-axis direction so that a position of an image is maintained. Similarly, when the object side of the binocular 10 moves, relatively to the eyepiece side, in the x-axis direction due to the hand-held shake, the driving mechanism 17 moves the third lens L3 in the x-axis direction so that the image position is maintained. In this specification, the angle formed between the optical axes O before and after the binocular 10 has been moved in the y-axis direction is referred to as a tilt angle in the y-axis direction, and the angle formed between the optical axes O before and after the binocular 10 has been moved in the x-axis direction is referred to as a tilt angle in the x-axis direction. It should be noted that the hand-held shake applied to the binocular 10 can be represented by the tilt angle(s) in the x-axis and/or y-axis directions, and accordingly, the image can be stabilized by moving the third lens L3 in the x-axis and/or y-axis direction.

FIG. 3 shows an example of the driving mechanism 17 for driving the third lens L3.

The driving mechanism 17 includes a rectangular lens frame 18 that holds the third lenses L3 of both the telescopic optical systems at openings formed thereon, a first actuator 24 for linearly shifting the rectangular lens frame 18 in the y-axis direction and a second actuator 29 for linearly shifting the frame 18 in the x-axis direction.

At longitudinal side ends of the lens frame 18, a pair of guide bars 21 and 21 are provided. The guide bar 21 has a center bar 21a and edge bars 21b formed at both edges of the center bar 21a. Both of the edge bars 21b are perpendicular to the center bar 21a and are directed to the same direction. The guide bars 21 and 21 are arranged such that the center bars 21a and 21a are parallel to the y-axis and that the tip ends of the edge bars 21b and 21b are faced to the rectangular lens frame 18.

The center bars 21a and 21a of the guide bars 21 and 21 are slidably fitted in through-holes formed in a pair of supports 22 and 22 that are formed inside the body 101 of the binocular.

The tip ends of the edge bars 21b of the one guide bars 21 are slidably inserted into holes 27a and 27a formed at one side end of the rectangular lens frame 18. The tip ends of the edge bars 21b of the other guide bars 21 are slidably inserted into holes 27b and 27b formed at the opposite side end of the rectangular lens frame 18.

With this structure, the lens frame 18 is movable in the y-axis direction and in the x-axis direction.

The first and second actuator 24 and 29 are secured on the inner surface of the body 101 of the binocular. A plunger 24a of the first actuator 24 is capable of protruding/retracting in the y-axis direction. The plunger 24a abuts a projection 23 formed on the lens frame 18 between the pair of third lenses L3. Further, coil springs 26 and 26 are provided to the center bars 21a and 21a to bias the lens frame 18 in the upward direction in FIG. 3 with respect to the body 101 of the binocular.

A plunger 29a of the second actuator 29 is capable of protruding/retracting in the x-axis direction. The plunger 29a abuts a projection 28 formed on the side of the lens frame 18. The coil springs 30 and 30 are provided to the edge bars 21b and 21b of the one guide bar 21 to bias the lens frame 18 in the rightward direction in FIG. 3.

When electrical power is applied to the first actuator 24 to make the plunger 24a protrude, the plunger 24a pushes the projection 23 to linearly move the rectangular lens frame 18 in the downward direction in FIG. 3. When the electrical power for retracting the plunger 24a is applied to the actuator 24, due to force of the coil springs 26, the projection 23 is kept contacting the plunger 24a, i.e., the lens frame 18 moves in the upward direction in FIG. 3.

In the same manner, when the electrical power is applied to the second actuator 29 to make the plunger 29a protrude, the projection 28 is pushed to linearly move the rectangular lens frame 18 in the leftward direction in FIG. 3. When the electrical power for retracting the plunger 29a is applied, the lens frame 18 moves in the rightward direction in FIG. 3 due to force of the coil springs 30 and 30.

When the third lens L3 is moved in the y-axis direction, the image in the user view moves in the vertical (up/down) direction. Accordingly, by controlling the first actuator 24, the vertical movement of the image due to the vertical hand-held shake can be compensated, while by controlling the second actuator 29, the horizontal movement of the image due to the horizontal hand-held shake can be compensated.

Further, the driving mechanism 17 is provided with an x-direction position sensor 221 and a y-direction position sensor 227 that are also secured to the body 101 of the binocular. The position sensor may be an optical sensor having a light emitting element and a position sensitive device (PSD).

As shown in FIG. 4, the first and second actuators 24 and 29 are controlled by a controller 233 through drivers 222 and 228, respectively. The controller 233 controls the drivers 222 and 228 based on the signals from a vertical hand-held shake sensor 150V, a horizontal hand-held shake sensor 150H, the x-direction position sensor 221, and the y-direction position sensor 227.

The controller 233 calculates amount of movements of the binocular in the vertical and horizontal directions due to the hand-held shake, and controls the drivers 222 and 228 to drive the first and second actuators 24 and 29 by an amount corresponding to the amount of movement of the image due to the hand-held shake. Specifically, the controller 233 determines a target position to which the lens frame 18 is to be positioned for canceling change of the position of the image due to the hand-held shake based on the amount of movement detected by the hand-held shake sensors 150V and 150H. Then, the controller 233 controls the driver to move the lens frame 18 to the calculated target position with monitoring the position detected by the position sensors 221 and 227. As the above control is continuously executed, the controller 233 continuously updates the target position, and accordingly, trembling of the images due to the hand-held shake is compensated.

In the above embodiment shown in FIG. 1, the third lens L3 (the second lens group G2) is only movable to compensate the image-vibration due to the hand-held shake. It should be noted that the image-vibration compensation function can be distributed into two lens groups. In the alternative embodiment, the third lens L3 (the second lens group G2) is movable in the y-axis direction and the fourth lens L4 (the third lens group G3) is movable in the x-axis direction.

FIG. 5 shows an example of the driving mechanism 50 for driving the third lens L3 in the y-axis direction and FIG. 6 shows an example of the driving mechanism 60 for driving the fourth lens L4 in the x-axis direction.

As shown in FIG. 5, the driving mechanism 50 includes a rectangular lens frame 51 that holds the third lenses L3 of both the telescopic optical systems at openings formed thereon and an actuator 55 for linearly shifting the rectangular lens frame 51 in the y-axis direction.

At longitudinal side ends of the lens frame 51, a pair of guide bars 52 and 52 are provided. The guide bar 52 has a center bar 52a and edge bars 52b formed at both edges of the center bar 52a. Both of the edge bars 52b are perpendicular to the center bar 52a and are directed to the same direction. The guide bars 52 and 52 are arranged such that the center bars 52a and 52a are parallel to the y-axis and that the tip ends of the edge bars 52b and 52b are faced to the rectangular lens frame 51.

The center bars 52a and 52a of the guide bars 52 and 52 are slidably fitted in through-holes formed in a pair of supports 53 and 53 that are formed inside the body 101 of the binocular.

The tip ends of the edge bars 52b of the one guide bars 52 are fixed to the right side end of the rectangular lens frame 51. The tip ends of the edge bars 52b of the other guide bars 52 are fixed the left side end of the rectangular lens frame 51.

With this structure, the lens frame 51 is movable in the y-axis direction.

The actuator 55 is secured on the inner surface of the body 101 of the binocular. A plunger 55a of the actuator 55 is capable of protruding/retracting in the y-axis direction. The plunger 55a abuts a projection 54 formed on the lens frame 51 between the pair of third lenses L3. Further, coil springs 56 and 56 are provided to the center bars 52a and 52a to bias the lens frame 51 in the upward direction in FIG. 5 with respect to the body 101 of the binocular.

When electrical power is applied to the actuator 55 to make the plunger 55a protrude, the plunger 55a pushes the projection 54 to linearly move the rectangular lens frame 51 in the downward direction in FIG. 5. When the electrical power for retracting the plunger 55a is applied to the actuator 55, due to force of the coil springs 56, the projection 54 is kept contacting the plunger 55a, i.e., the lens frame 51 moves in the upward direction in FIG. 5.

When the third lens L3 is moved in the y-axis direction, the image in the user view moves in the vertical (up/down) direction. Accordingly, by controlling the actuator 55, the vertical movement of the image due to the vertical hand-held shake can be compensated.

As shown in FIG. 6, the driving mechanism 60 includes a rectangular lens frame 61 that holds the fourth lenses L4 of both the telescopic optical systems at openings formed thereon and an actuator 65 for linearly shifting the rectangular lens frame 61 in the x-axis direction.

At up/down side ends of the lens frame 51 in FIG. 6, a pair of guide bars 62 and 62 are provided. The guide bar 62 has a center bar 62a and edge bars 62b formed at both edges of the center bar 62a. Both of the edge bars 62b are perpendicular to the center bar 62a and are directed to the sane direction. The guide bars 62 and 62 are arranged such that the center bars 62a and 62a are parallel to the x-axis and that the tip ends of the edge bars 62b and 62b are faced to the rectangular lens frame 61.

The center bars 62a and 62a of the guide bars 62 and 62 are slidably fitted in through-holes formed in a pair of supports 63 and 63 that are formed inside the body 101 of the binocular.

The tip ends of the edge bars 62b of the one guide bars 62 are fixed to the up side end of the rectangular lens frame 61. The tip ends of the edge bars 62b of the other guide bars 62 are fixed the down side end of the rectangular lens frame 51.

With this structure, the lens frame 61 is movable in the x-axis direction.

The actuator 65 is secured on the inner surface of the body 101 of the binocular. A plunger 65a of the actuator 65 is capable of protruding/retracting in the x-axis direction. The plunger 65a abuts a projection 64 formed on the down side end of the lens frame 61. Further, coil springs 66 and 66 are provided to the center bars 62a and 62a to bias the lens frame 61 in the rightward direction in FIG. 6 with respect to the body 101 of the binocular.

When electrical power is applied to the actuator 65 to make the plunger 65a protrude, the plunger 65a pushes the projection 64 to linearly move the rectangular lens frame 61 in the leftward direction in FIG. 6. When the electrical power for retracting the plunger 65a is applied to the actuator 65, due to force of the coil springs 66, the projection 64 is kept contacting the plunger 65a, i.e., the lens frame 61 moves in the rightward direction in FIG. 6.

When the third lens L4 is moved in the x-axis direction, the image in the user view moves in the horizontal (right/left) direction. Accordingly, by controlling the actuator 65, the horizontal movement of the image due to the horizontal hand-held shake can be compensated.

The actuators 55 and 65 are controlled by the controlling system as shown in FIG. 4 to move the third lenses L3 in the y-axis direction to compensate the vertical movement of the image and to move the fourth lenses L4 in the x-axis direction to compensate the horizontal movement of the image. As a result, a user can observe stabilized image even when the hand-held shake is applied to the binocular.

In the above embodiment shown in FIGS. 5 and 6, each of the second and third lens groups G2 and G3 is movable in one direction respectively. Alternatively, each of these lens groups may be movable in any directions perpendicular to the optical axis, that is, the driving mechanism as shown in FIG. 3 may be applied to each of the second and the third lens groups. Since the second lens group G2 has negative power and the third lens group has positive power, the decentering directions to stabilize the image are opposite to each other. Therefore, when the second and third lens groups are driven in the opposite directions at the same time to stabilize the image, inertial moment due to movements can be counterbalanced.

According to the embodiment, the telescopic optical system satisfies conditions (1) and (2):

(1) $0.1 < d_{12}/f_0$ (2) $0.7 < f_0/f_1 < 3.0$ where, $d_{12}$ is a distance between the first lens group and the second lens group, $f_0$ is the focal length of the objective optical system, and $f_1$ is the focal length of the first lens group.

Condition (1) defines a range of a distance between the first lens group G1 and the second lens group G2 of the objective optical system OL. Since the first lens group G1 has a positive refractive power, the larger the distance $d_{12}$ is, the smaller the diameter of the area through which light rays pass, where the light rays are convergent. If condition (1) is satisfied, the diameters of the second and third lens groups, which may be a compensation lens group, are sufficiently small, which allows compact construction of the compensation system. If the distance $d_{12}$ is smaller than the lower limit, the diameter of the second and third lens groups must become too large to make the compensation system be compact.

Condition (2) defines a range of a ratio of the focal length of the objective optical system OL with respect to the focal length of the first lens group G1. If condition (2) is satisfied, the objective optical system OL can be made with three through five lens elements and the entire length of the objective optical system OL are sufficiently small. If the ratio is smaller than the lower limit, the second principal point of the objective optical system is too close to the image formed by the objective optical system, the entire length of the objective optical system cannot be sufficiently small. If the ratio is larger than the upper limit, the positive refractive power of the first lens group G1 is so large that the aberrations caused by the first lens group G1 cannot be corrected by two or three lenses of the second and third lens groups G2 and G3.

When the ratio $f_0/f_1$ equals to "1", the composite magnification of the second and third lens groups G2 and G3 equals to "1", the image formed by the first lens group G1 is transmitted just as it is through the second and third lens groups. In such a case, a general objective lens, which is designed to be used as a single group objective lens, can be diverted as the first lens group G1.

When the ratio $f_0/f_1$ equals to "1", ratio of decentering sensitivities of the second and third lens groups equals to "−1". The decentering sensitivity is defined as a ratio of the tilt angle due to hand-held shake with the decentering amount of the compensation lens group to stabilize an image.

When the second and third lens groups are the compensation lens groups, it is preferable that the telescopic optical system further satisfies condition (3):

(3) $-0.95 < (\phi_2-\phi_1)/(\phi_3-\phi_2) < -1.05$ where, $\phi_1$ is a refractive power of the first lens group, $\phi_2$ is a resultant refractive power of the first and second lens groups, and $\phi_3$ is a resultant refractive power of the first through third lens groups.

Condition (3) defines that an allowable range of a ratio of the decentering sensitivities of the second and third lens groups G2 and G3 is ±5% when the ratio is designed to be "−1". If the condition (3) is satisfied, a general single group objective lens can be diverted.

When the ratio $f_0/f_1$ is smaller than "1", absolute value of the decentering sensitivity of the third lens group G3 is larger than that of the second lens group G2. In such a case, the third lens group G3 is suitable to be used as the compensation lens group. Because the larger the decentering sensitivity is, the smaller the moving amount of the lens group to stabilize the image, then the smaller the compensation system is.

On the contrary, when the ratio $f_0/f_1$ is larger than "1", absolute value of the decentering sensitivity of the second lens group G2 is larger than that of the third lens group G3. In such a case, the second lens group G2 is suitable to be used as the compensation lens group.

In the case where only the second lens group is movable in a direction perpendicular to the optical axis, it is desirable to satisfy condition (4). When only the third lens group is movable, it is desirable to satisfy condition (5). Further, if both the second and third lens groups are movable in directions perpendicular to the optical axis, it is desirable to satisfy the conditions (4) and (5).

(4) $0.5 < |\tan 1°/(\phi_2-\phi_1)| < 5.0$ (unit: mm)

(5) $0.5 < |\tan 1°/(\phi_3-\phi_2)| < 5.0$ (unit: mm)

Condition (4) defines a range of a decentering amount of the second lens group G2 to stabilize an image when the tilt angle of the optical system is 1 degree. Condition (5) defines a similar range for the third lens group G3. If condition (4) (or (5)) is satisfied, the decentering sensitivity of the second lens group G2 (the third lens group G3) falls within a suitable range for compensating the trembling of the image due to the hand-held shake. If the ratio is smaller than the lower limit, the decentering sensitivity is too large to control. If the ratio is larger than the upper limit, the decentering sensitivity is too small, which increases the size of the driving mechanism.

In the image-vibration compensation system of the lens decentering type, inertial mass of the compensation lens group should be as small as possible to lower load for the driving mechanism. Thus, it is preferable that the compensation lens group consists of a plastic lens that is light in weight as compared with a glass lens.

Further, a lens having large spherical aberration generates large decentering coma when the lens is decentered due to image-vibration compensation. Thus the spherical aberration of the compensation lens group should be as small as possible. When the compensation lens group consists of a single lens, it is preferable that at least one surface of the lens of the compensation lens group is an aspherical surface to correct spherical aberration. From this view point, the plastic lens is preferable because it is easy to form an aspherical surface through injection molding.

For instance, when the second lens group G2 is the compensation lens group and the second lens group G2 consists of a single negative lens, at least one surface of the negative lens should be aspherical so that the thickness of the lens in the periphery is smaller than that when the surface is a spherical surface having the identical paraxial curvature. On the other hand, when the third lens group G3 is the compensation lens group and the third lens group G3 consists of a single positive lens, at least one surface of the positive lens should be aspherical so that the thickness of the lens in the periphery is larger than that when the surface is a spherical surface having the identical paraxial curvature.

Numerical Embodiments

Hereafter, numerical embodiments of the telescopic optical systems will be described with reference to FIGS. 7 through 15.

First Embodiment

FIG. 7 shows a telescopic optical system according to a first embodiment and the numerical construction thereof is described in TABLE 1. The objective optical system OL includes three lens groups having four lenses L1 through L4. The first lens group consists of the positive first lens L1 and the negative second lens L2 cemented to each other, the second lens group consists of the negative third lens L3, and the third lens group consists of a positive fourth lens L4. The second and third lens groups (L3 and L4) are compensation lens groups. The third lens L3 and the fourth lens L4 are plastic lenses having aspherical surfaces. The prisms P1 and P2 of the erecting system PS are shown as plane parallel plates in FIG. 7.

In TABLE 1, r (mm) denotes a radius of curvature of a surface (the values at the vertex for aspherical surfaces), d (mm) denotes a distance between the surfaces along the optical axis, n denotes a refractive index at a wavelength of 588 nm and vd denotes an Abbe number.

TABLE 1

| Surface Number | r | d | n | vd |
| --- | --- | --- | --- | --- |
| #1 | 62.132 | 4.800 | 1.51633 | 64.1 |
| #2 | −44.700 | 1.800 | 1.60342 | 38.0 |
| #3 | −196.544 | 33.780 | | |
| #4 | −140.000 | 2.000 | 1.52580 | 56.3 |
| #5 | 48.524 | 3.000 | | |
| #6 | 50.000 | 3.000 | 1.52580 | 56.3 |
| #7 | −124.714 | 2.630 | | |
| #8 | INFINITY | 34.000 | 1.56883 | 56.3 |
| #9 | INFINITY | 4.500 | | |
| #10 | INFINITY | 32.000 | 1.56883 | 56.3 |
| #11 | INFINITY | 5.800 | | |
| #12 | −93.620 | 4.000 | 1.49176 | 57.4 |
| #13 | 93.620 | 14.830 | | |
| #14 | 23.936 | 6.770 | 1.49176 | 57.4 |
| #15 | −10.075 | 0.700 | | |
| #16 | −11.190 | 2.000 | 1.58547 | 29.9 |
| #17 | 25.294 | 0.200 | | |
| #18 | 24.157 | 6.200 | 1.49176 | 57.4 |
| #19 | −15.260 | 0.500 | | |
| #20 | 22.703 | 3.500 | 1.60311 | 60.7 |
| #21 | −75.123 | — | | |

The image side surface #5 of the third lens L3 and the object side surface #6 of the fourth lens L4 are aspherical surfaces. Further, surfaces #13 and #15 of the eyepiece EP are also aspherical surfaces. An aspherical surface is expressed by the following equation:

$$X(h) = \frac{h^2 C}{1 + \sqrt{1 - (1+K)h^2 C^2}} + A_4 h^4 + A_6 h^6 + A_8 h^8 + A_{10} h^{10}$$

where, X(h) is a SAG, that is, a distance of a curve from a tangential plane at a point on the surface where the height from the optical axis is h. C is a curvature (1/r) of the vertex of the surface, K is a conic constant, $A_4$, $A_6$, $A_8$ and $A_{10}$ are aspherical surface coefficients of fourth, sixth, eighth and tenth orders. The constant K and coefficient $A_4$ are indicated in TABLE 2. In the embodiments, coefficients $A_6$, $A_8$ and $A_{10}$ are equal to zero.

TABLE 2

| | | |
|---|---|---|
| 5th surface | K = 0.00000 | $A_4 = -0.15000 \times 10^{-5}$ |
| 6th surface | K = 0.00000 | $A_4 = -0.15000 \times 10^{-5}$ |
| 13th surface | K = 0.00000 | $A_4 = -0.12000 \times 10^{-4}$ |
| 15th surface | K = -1.00000 | $A_4 = -0.46000 \times 10^{-5}$ |

FIGS. 8A through 8D show third order aberrations of the telescopic optical system according to the first embodiment:

FIG. 8A shows spherical aberrations at d-line (588 nm), g-line (436 nm) and c-line (656 nm);

FIG. 8B shows a lateral chromatic aberration at the same wavelengths as in FIG. 6A;

FIG. 8C shows an astigmatism (S: Sagittal, M: Meridional); and

FIG. 8D shows distortion.

The vertical axis in FIG. 8A represents a diameter of an eye ring, and the vertical axes in FIGS. 8B through 8D respectively represent an angle B formed between the exit ray from the eyepiece and the optical axis. Unit of the horizontal axis is "mm" in each of FIGS. 8A through 8C, and is "percent" in FIG. 8D.

FIG. 9A is a graph showing the axial coma of the telescopic optical system of the first embodiment when the second and third lens groups (L3 and L4) are not decentered, FIG. 9B is a graph showing the axial coma where the second lens group (L3) is decentered to stabilize the image when the tilt angle due to the hand-held shake is 1 degree, and FIG. 9C is a graph showing the axial coma where the third lens group (L4) is decentered to stabilize the image when the tilt angle due to the hand-held shake is 1 degree.

Second Embodiment

FIG. 10 shows an optical system according to a second embodiment. The numerical construction of the second embodiment is indicated in TABLE 3. The objective optical system OL includes three lens groups having five lenses L1 through L5. The first lens group consists of the positive first lens L1 and the negative second lens L2 cemented to each other, the second lens group consists of the positive third lens L3 and the negative fourth lens L4 cemented to each other, and the third lens group consists of a positive fifth lens L5. The third lens group (L5) is a compensation lens group.

TABLE 3

| Surface Number | r | d | n | vd |
|---|---|---|---|---|
| #1 | 74.558 | 5.760 | 1.51633 | 64.1 |
| #2 | -53.640 | 2.160 | 1.60342 | 38.0 |

TABLE 3-continued

| Surface Number | r | d | n | vd |
|---|---|---|---|---|
| #3 | -235.853 | 19.000 | | |
| #4 | -271.260 | 3.600 | 1.69680 | 55.5 |
| #5 | -54.564 | 2.400 | 1.57135 | 53.0 |
| #6 | 65.500 | 6.000 | | |
| #7 | 50.000 | 4.200 | 1.49176 | 57.4 |
| #8 | -390.413 | 20.000 | | |
| #9 | INFINITY | 34.000 | 1.56883 | 56.3 |
| #10 | INFINITY | 2.000 | | |
| #11 | INFINITY | 32.000 | 1.56883 | 56.3 |
| #12 | INFINITY | 5.800 | | |
| #13 | -93.620 | 4.000 | 1.49176 | 57.4 |
| #14 | 93.620 | 14.830 | | |
| #15 | 23.936 | 6.770 | 1.49176 | 57.4 |
| #16 | -10.075 | 0.700 | | |
| #17 | -11.190 | 2.000 | 1.58547 | 29.9 |
| #18 | 25.294 | 0.200 | | |
| #19 | 24.157 | 6.200 | 1.49176 | 57.4 |
| #20 | -15.260 | 0.500 | | |
| #21 | 22.703 | 3.500 | 1.60311 | 60.7 |
| #22 | -75.123 | — | | |

The object side surface #7 of the fifth lens L5 is an aspherical surface. Further, the surfaces #14 and #16 are also aspherical surfaces. The constant K and coefficients $A_4$ are indicated in TABLE 4. The coefficients $A_6$, $A_8$ and $A_{10}$ are equal to zero.

TABLE 4

| | | |
|---|---|---|
| seventh surface | K = 0.00000 | $A_4 = -0.82000 \times 10^{-6}$ |
| 14th surface | K = 0.00000 | $A_4 = -0.12000 \times 10^{-4}$ |
| 16th surface | K = -1.00000 | $A_4 = -0.46000 \times 10^{-5}$ |

FIGS. 11A through 11D show third order aberrations of the telescopic optical system according to the second embodiment.

FIG. 12A is a graph showing the axial coma of the telescopic optical system of the second embodiment when the third lens group (L5) is not decentered. FIG. 12B is a graph showing the axial coma when the third lens group (L5) is decentered to stabilize the image when the tilt angle is 1 degree.

Third Embodiment

FIG. 13 shows an optical system according to a third embodiment, and the numerical construction thereof is indicated in TABLE 5. The objective optical system OL includes three lens groups having four lenses L1 through L4. The first lens group consists of the positive first lens L1 and the negative second lens L2 cemented to each other, the second lens group consists of the negative third lens L3, and the third lens group consists of a positive fourth lens L4. The second lens group (L3) is a compensation lens group.

TABLE 5

| Surface Number | r | d | n | vd |
|---|---|---|---|---|
| #1 | 49.706 | 3.840 | 1.51602 | 56.8 |
| #2 | -35.760 | 1.440 | 1.61293 | 37.0 |
| #3 | -157.235 | 27.000 | | |
| #4 | 300.000 | 2.000 | 1.52580 | 56.3 |
| #5 | 31.172 | 3.000 | | |
| #6 | 50.000 | 3.000 | 1.52580 | 0.0 |

TABLE 5-continued

| Surface Number | r | d | n | vd |
|---|---|---|---|---|
| #7 | 313.013 | 17.960 | | |
| #8 | INFINITY | 34.000 | 1.56883 | 56.3 |
| #9 | INFINITY | 4.500 | | |
| #10 | INFINITY | 32.000 | 1.56883 | 56.3 |
| #11 | INFINITY | 5.800 | | |
| #12 | −93.620 | 4.000 | 1.49176 | 57.4 |
| #13 | 93.620 | 14.830 | | |
| #14 | 23.936 | 6.770 | 1.49176 | 57.4 |
| #15 | −10.075 | 0.700 | | |
| #16 | −11.190 | 2.000 | 1.58547 | 29.9 |
| #17 | 25.294 | 0.200 | | |
| #18 | 24.157 | 6.200 | 1.49176 | 57.4 |
| #19 | −15.260 | 0.500 | | |
| #20 | 22.703 | 3.500 | 1.60311 | 60.7 |
| #21 | −75.123 | — | | |

The image side surface #5 of the third lens L3 and the object side surface #6 of the fourth lens L4 is an aspherical surface. Further, surfaces #13 and #15 are also aspherical surfaces. The constant K and coefficients $A_4$ are indicated in TABLE 6. The coefficients $A_6$, $A_8$ and $A_{10}$ are equal to zero.

TABLE 6

| 5th surface | K = 0.00000 | $A_4 = -0.15000 \times 10^{-5}$ |
|---|---|---|
| 6th surface | K = 0.00000 | $A_4 = -0.30000 \times 10^{-6}$ |
| 13th surface | K = 0.00000 | $A_4 = -0.12000 \times 10^{-4}$ |
| 15th surface | K = −1.00000 | $A_4 = -0.46000 \times 10^{-5}$ |

FIGS. 14A through 14D show third order aberrations of the telescopic optical system according to the third embodiment.

FIG. 15A is a graph showing the axial coma of the telescopic optical system of the third embodiment when the second lens group (L3) is not decentered, and FIG. 15B is a graph showing the axial coma when the second lens group (L3) is decentered to stabilize the image when the tilt angle is 1 degree.

TABLE 7 shows the values of the first to third embodiments for conditions (1) to (5).

TABLE 7

| | First Embodiment | Second Embodiment | Third Embodiment |
|---|---|---|---|
| Condition (1) $d_{12} / f_0$ | 0.32 | 0.178 | 0.253 |
| Condition (2) $f_0 / f_1$ | 1.00 | 0.83 | 1.53 |
| Condition (3) $(\phi_2 - \phi_1)/(\phi_3 - \phi_2)$ | −1.00 | — | — |
| Condition (4) $|\tan 1°/(\phi_2 - \phi_1)|$ | 1.86 | — | 1.81 |
| Condition (5) $|\tan 1°/(\phi_3 - \phi_2)|$ | 1.86 | 2.00 | — |

The condition (3) is directed to the embodiment where the second and third lens groups are the compensation lens groups, no values are indicated for the second and third embodiments. The condition (4) is directed to the embodiment where the second lens group is a compensation lens group, the condition (5) is directed to the embodiment where the third lens group is a compensation lens group. Therefore, the second embodiment does not indicate value in condition (4) and the third embodiment does not indicate value in condition (5).

Each of the embodiments satisfies conditions directed thereof, and is suitable to the telescopic optical system of a binocular having an image-vibration compensation system.

It should be noted that, in the embodiments, the erected images are observed through the eyepiece EP. The invention is not limited to this particular structure, and is applicable to an observing equipment in which imaging devices (e.g., a CCD: a Charge Coupled Device) and an imaging lenses are used in place of, or in association with the eyepiece EP.

Further, in the above embodiments, the image-vibration compensation system is designed for compensating trembling of the image due to both the vertical and horizontal hand-held shakes. However, the system may be designed for compensating the hand-held shake in one of these two directions according to uses.

The present invention is directed the optical system of an observing equipment that includes hand-held shake sensors, sensors for detecting the position of the compensation lenses. However, the details of the hand-held shake sensors and/or position detection sensors do not form part of the invention These are provided to assist in understanding of the invention, and any types of suitable hand-held shake sensors and/or position detecting sensors could be employed to control the driving mechanism for the compensation lenses.

What is claimed is:

1. An optical system for an observing system of a binocular having an image-vibration compensation system, said optical system including an objective optical system comprising:

a first lens group having positive refractive power;

a second lens group having negative refractive power; and a third lens group having positive refractive power, said lens groups being arranged in that order from an object side, wherein at least one of said second and third lens groups is movable in a direction perpendicular to an optical axis of said objective optical system to compensate for vibration of an image due to a hand-held shake, and wherein the following relationships are satisfied:

$0.1 < d_{12}/f_0 < 0.32$ $0.7 < f_0/f_1 < 3.0$ where, $d_{12}$ is a distance between said first lens group and said second lens group, $f_0$ is a focal length of said objective optical system, and $f_1$ is a focal length of said first lens group, said observing system further comprising an eyepiece through which a user observes an image formed by said objective optical system and an erecting system that is located between said objective optical system and said eyepiece, said first lens, group consisting of a positive lens and a negative lens said second lens group consisting of a negative lens and said third lens group consisting of a positive lens.

2. The optical system according to claim 1, wherein only said second lens group is movable in a direction perpendicular to said optical axis.

3. The optical system according to claim 2, wherein the following relationship is satisfied:

$0.5 < |\tan 1°/(\phi_2 - \phi_1)| < 5.0$ where, $\phi_1$ is a refractive power of said first lens group, and $\phi_2$ is a resultant refractive power of said first and second lens groups.

4. The optical system according to claim 1, wherein only said third lens group is movable in a direction perpendicular to said optical axis.

5. The optical system according to claim 4, wherein the following relationship is (5) satisfied:

$0.5 < |\tan 1°/(\phi_3 - \phi_2)| < 5.0$ where, $\phi_2$ is a resultant refractive power of said first and second lens groups, and $\phi_3$ is a resultant refractive power of said first through third lens groups.

6. The optical system according to claim 1, wherein at least one surface of said negative lens of said second lens group is an aspherical surface of which an absolute value of curvature decreases as distance from an optical axis increases.

7. The optical system according to claim 1, wherein at least one surface of said positive lens of said third lens group is an aspherical surface of which an absolute value of curvature decreases as distance from an optical axis increases.

8. An optical system for an observing system having an image-vibration compensation system, said optical system including an objective optical system comprising:

a first lens group having positive refractive power;

a second lens group having negative refractive power; and a third lens group having positive refractive power, said lens groups being arranged in that order from an object side, wherein said second and third lens groups are movable in a direction perpendicular to an optical axis of said objective optical system to compensate for vibration of an image due to a hand-held shake, and wherein the following relationships are satisfied:

$0.1 < d_{12}/f_0 < 0.32$ $0.7 f_0/f_1 < 3.0$ $-0.95 < (\phi_2 - \phi_1)/(\phi_3 - \phi_2) < -1.05$ where, $d_{12}$ is a distance between said first lens group and said second lens group, $f_0$ is a focal length of said objective optical system, $f_1$ is a focal length of said first lens group $\phi_1$ is a refractive power of said first lens group, $\phi_2$ is a resultant refractive power of said first and second lens groups, and $\phi_3$ is a resultant refractive power of said first through third lens group.

9. An optical system for an observing system having an image-vibration compensation system, said optical system including an objective optical system comprising:

a first lens group having positive refractive power;

a second lens group having negative refractive power; and a third lens group having positive refractive power, said lens groups being arranged in that order from an object side, wherein both said second and third lens groups are movable in directions perpendicular to an optical axis of said objective optical system to compensate for vibration of an image due to a hand-held shake, and wherein the following relationships are satisfied:

$0.1 < d_{12}/f_0 < 0.32$ $0.7 < f_0/f_1 < 3.0$ where, $d_{12}$ is a distance between said first lens group and said second lens group, $f_0$ is a focal length of said objective optical system, and $f_1$ is a focal length of said first lens group.

10. The optical system according to claim 9, wherein the following relationships are satisfied:

$0.5 < |\tan 1°/(\phi_2 - \phi_1)| < 5.0$ $0.5 < |\tan 1°/(\phi_3 - \phi_2)| < 5.0$ where, $\phi_1$ is a refractive power of said first lens group, $\phi_2$ is a resultant refractive power of said first and second lens groups, and $\phi_3$ is a resultant refractive power of said first through third lens groups.

11. The optical system according to claim 9, wherein said second lens group is movable along a first direction in a plane perpendicular to said optical axis and said third lens group is movable along a second direction that intersects with said first direction at a right angle in said plane.

12. An optical system for an observing system having an image-vibration compensation system, said optical system including an objective optical system comprising:

a first lens group having positive refractive power;

a second lens group having negative refractive power; and a third lens group having positive refractive power, said lens groups being arranged in that order from an object side, wherein said second and third lens groups are movable in a direction perpendicular to an optical axis of said objective optical system to compensate for vibration of an image due to a hand-held shake, and wherein the following relationships are satisfied:

$0.7 < f_0/f_1 < 3.0$ $-0.95 < (\phi_2 - \phi_1)/(\phi_3 - \phi_2) < -1.05$ where, $f_0$ is a focal length of said objective optical system, $f_1$ is a focal length of said first lens group $\phi_1$ is a refractive power of said first lens group, $\phi_2$ is a resultant refractive power of said first and second lens groups, and $\phi_3$ is a resultant refractive power of said first through third lens group.

13. An optical system for an observing system having an image-vibration compensation system, said optical system including an objective optical system comprising:

a first lens group having positive refractive power;

a second lens group having negative refractive power; and a third lens group having positive refractive power, said lens groups being arranged in that order from an object side, wherein both said second and third lens groups are movable in directions perpendicular to an optical axis of said objective optical system to compensate for vibration of an image due to a hand-held shake, and wherein the following relationship is satisfied:

$0.7 < f_0/f_1 < 3.0$ where, $f_0$ is a focal length of said objective optical system, and $f_1$ is a focal length of said first lens group.

* * * * *

UNITED STATES PATENT AND TRADEMARK OFFICE
CERTIFICATE OF CORRECTION

PATENT NO. : 6,226,123 B1  
DATED : May 1, 2001  
INVENTOR(S) : Moriyasu Kanai et al.

Page 1 of 1

It is certified that error appears in the above-identified patent and that said Letters Patent is hereby corrected as shown below:

<u>Title page,</u>
Item [73], Assignee: "Asahi Kogyo Kabusiki Kaishai, Tokyo (JP)" should be -- Asahi Kogaku Kogyo Kabushiki Kaisha, Tokyo (JP) --

Signed and Sealed this

Nineteenth Day of February, 2002

Attest:

Attesting Officer

JAMES E. ROGAN
*Director of the United States Patent and Trademark Office*